United States Patent [19]
Dell 'Acqua

[11] Patent Number: 6,022,608
[45] Date of Patent: Feb. 8, 2000

[54] NON-SLIP FABRIC WITH THREE LAYERS AND CONCAVE CUPS

[75] Inventor: Silvano Dell 'Acqua, Gorla Maggiore, Italy

[73] Assignee: Plantex S.p.A., Gorla Maggiore, Italy

[21] Appl. No.: 08/844,809

[22] Filed: Apr. 22, 1997

[30] Foreign Application Priority Data

Jul. 29, 1996 [IT] Italy .................................. MI96A1609

[51] Int. Cl.[7] ....................................................... B32B 3/26
[52] U.S. Cl. ........................... 428/132; 428/131; 428/138; 428/166; 428/178; 428/174; 428/156; 428/99; 4/582; 4/583
[58] Field of Search ..................................... 428/131, 132, 428/138, 166, 178, 174, 156, 99; 4/582, 583

[56] References Cited

U.S. PATENT DOCUMENTS

| | | | |
|---|---|---|---|
| 3,231,454 | 6/1996 | Williams | 428/166 |
| 3,813,279 | 5/1974 | Varner, Jr. | 428/166 |
| 4,628,549 | 12/1986 | Lazar | 428/88 |
| 5,151,312 | 9/1992 | Boeri | 428/156 |

*Primary Examiner*—William P. Watkins, III
*Attorney, Agent, or Firm*—Notaro & Michalos P.C.

[57] ABSTRACT

A three layer, non-slip fabric has an upper fabric layer which is bonded through an intermediate flat plastic layer to a lower plastic layer having cup-shaped elements distributed therelong. Each cup has sidewalls and an outwardly concave end wall with one or two holes in the wall to allow the cups to deform.

6 Claims, 1 Drawing Sheet

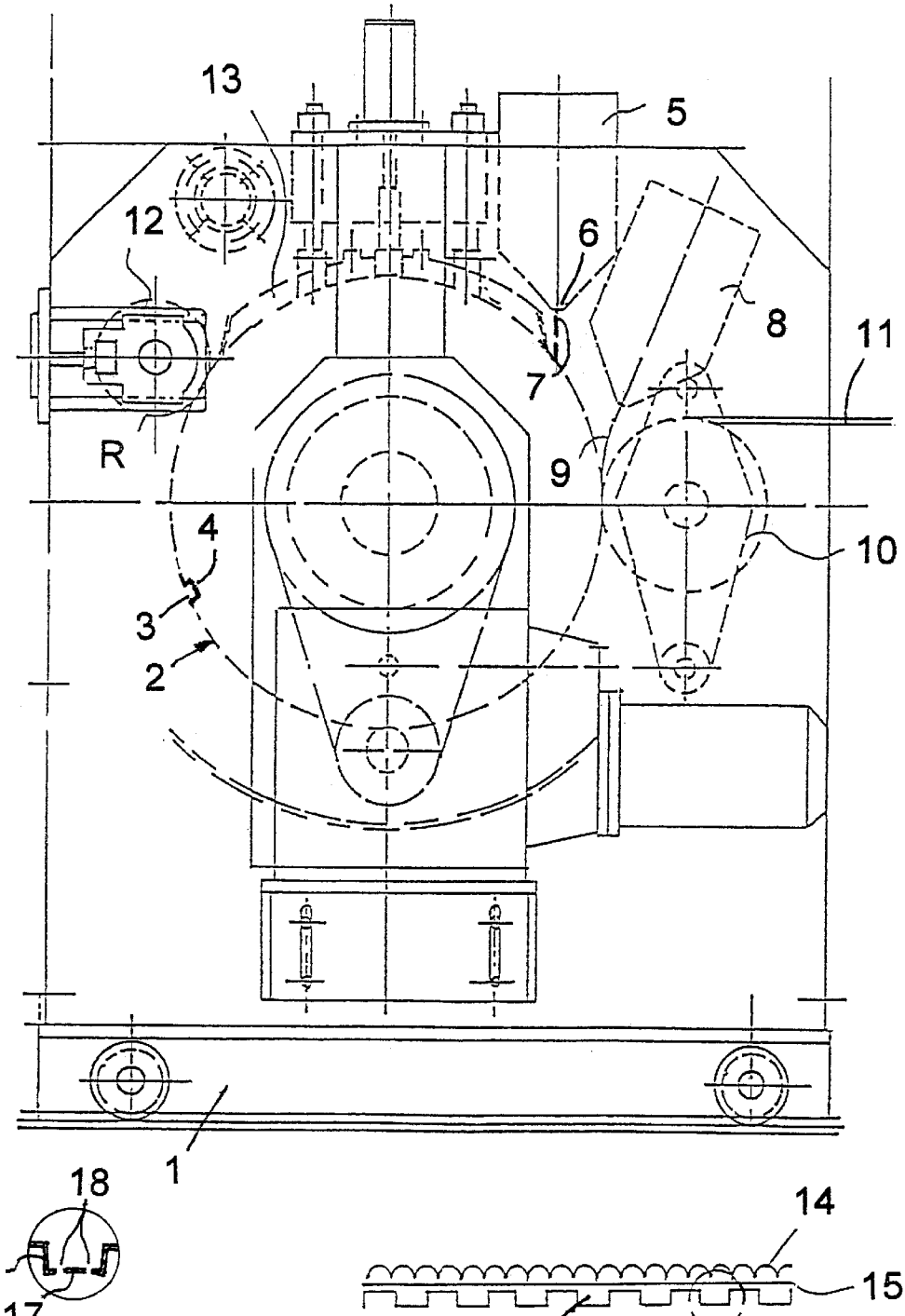

NON-SLIP FABRIC WITH THREE LAYERS AND CONCAVE CUPS

FIELD AND BACKGROUND OF THE INVENTION

This invention relates to a machine and a method for the manufacture of a non-slip fabric, in particular a heavy furnishing fabric intended, for example, for furnishing homes, cars, etc., such as wall-to-wall carpeting, mats and the like.

The fabric thus made, which also forms the subject of the invention, is characterised by the fact that it is bonded to a layer of plastic material shaped to present a series of cup-shaped protuberances which will be described in greater detail below, and which make the surface of the fabric on which they are situated non-slip.

In accordance with a preferred version of the invention, a second, thinner, flat layer of plastic material is inserted between the fabric and the said layer of shaped plastic material.

The method in accordance with the invention involves (i) extrusion by an extrusion head of a thin film which is made to adhere to the surface of a rotating drum presenting a number of seatings of the same shape as the cups to be made; (ii) suction of air from the inside of the drum through the end wall of the said seatings to cause the deformation of the said film; (iii) extrusion of a second film by a second extrusion head; and (iv) bonding of the said two films to one another and to a fabric conveyed from a reel, to obtain the end product. The invention relates to the field of equipment designed for the manufacture of heavy furnishing fabrics such as wall-to-wall carpeting, upholstery, mats and the like. Fabrics of this kind having a non-slip layer of material are already known.

For example, fabrics bonded to a layer of spongy material or to a layer of rubber or other material with a low coefficient of friction are known.

However, these known products present a number of drawbacks.

Rubber-based materials contain numerous harmful products and are non-ecological.

Spongy materials are unhygienic because dust, bacteria, etc. accumulate in them, and because if wet they absorb water, with the resulting problems.

SUMMARY OF THE INVENTION

These drawbacks are eliminated by the non-slip fabric in accordance with the invention, which is characterised by the fact that it is bonded to a layer of plastic material shaped to present marked non-slip characteristics without the drawbacks of known materials.

The materials usable with the process in accordance with the invention could be various plastics such as EVA, polyethylene, polypropylene or other suitable materials which, though thin and deformable, are compact and waterproof, do not allow the proliferation of moulds and bacteria, and are fully recyclable.

BRIEF DESCRIPTION OF THE DRAWINGS

These and other advantages will appear more clearly from the detailed description below, provided by way of example but not of limitation, by reference to the annexed figures in which:

FIG. 1 schematically illustrates a view of a machine in accordance with the invention FIG. 2 shows a fabric produced by the method in accordance with the invention, in cross-section.

FIG. 2a is a detail of the fabric shown in FIG. 2.

By reference to FIG. 1, the machine for the manufacture of non-slip fabric in accordance with the invention comprises a frame 1 to which is fitted a cylinder, schematically illustrated and indicated as no. 2, which is made to rotate around its own axis by a motor reducer unit 3.

The cylinder surface is shaped, and presents a number of cup-shaped seatings 3, one of which is more clearly shown in cross-section in the enlarged detail in FIG. 1.

Each of these seatings communicates with the inside of the drum through a hole 4.

The inside of the drum is connected to suction devices not shown in the figure, which keep the interior of the drum at a pressure lower than atmospheric pressure. An extrusion head 5 to which a die 6 conveys molten plastic such as EVA or other suitable material is located near the drum. The said material exits from head 5 in the form of a thin film, shown as no. 7.

Film 7 is deposited on the surface of the drum, to which it adheres by virtue of the difference in pressure between the inside and outside of the drum.

The same pressure difference deforms the film, still in the plastic state, causing it to take on the shape of seatings 3, and thus producing a number of cups all over the surface of the film.

Immediately downstream of extrusion head 5, a second head 8 extrudes a second, flat film 9, preferably thinner than the previous film, which is bonded to that film by pressure roll 10.

A strip of fabric 11 is also conveyed to this bonding area by a reel not shown in the figure; this fabric passes between pressure roll 10 and the two layers of film 7 and 9, so that the three materials are bonded together.

Downstream of roll 10, on the surface of cylinder 2, there is consequently a layer of plastic shaped to present a series of cups all over its surface, a second intermediate layer of flat plastic material, and a layer of fabric (in that order).

These three layers, which together form the "laminate", continue to adhere to the drum for as long as required to ensure sufficient cooling of the plastic layers, after which they are detached, passed over a bend wheel 12, and conveyed to collection devices not illustrated in the figure.

In the section between bend wheel 12 and extrusion head 5 on the cylinder there is a cover 13 designed to prevent external air from passing through the holes in the end wall of the cups in the cylinder and cancelling out the effect of the devices sucking out air from the inside.

The finished fabric is shown in cross-section in FIG. 2, in which no. 14 indicates the fabric, 15 the intermediate layer and 16 the layer of deformed plastic material.

As already mentioned, layer 16 is shaped to present a number of cups, one of which is shown in the enlarged detail in FIG. 2a.

These cups have a side wall 19 which is roughly straight and an end wall 17 which is flat or preferably concave, with the concavity facing outwards as shown in the detail in FIG. 2a, and contain at least one hole, or preferably a pair of holes, shown as no. 18.

Holes 18 are designed to allow the air in the cup to exit, so that the cup wall deforms to produce the required non-slip effect. As shown in FIG. 2a, the concave end wall 17 is arc-shaped from one portion of side wall 19 to an opposite portion of the side wall to help the non-slip effect.

Intermediate layer 15 is designed to prevent any water or damp in the fabric from passing to the cups and vice versa, especially when the fabric is used to make bath-mats and the like.

The result is an ecological non-slip fabric which presents excellent hygiene characteristics.

An expert in the field could devise numerous modifications and variations, all of which should be deemed to fall within the scope of this invention.

I claim:

1. A non-slip fabric for use as a mat, comprising:

a fabric layer (14);

an intermediate plastic film (15) bonded to the fabric layer;

a deformed plastic layer (16) bonded to the plastic film; and the plastic film being flat and the deformed plastic layer having a multiplicity of cup-shaped elements, each element having a side wall (19) and an end wall (17), the end wall of each cup-shaped element being concave in an outwardly facing direction with respect to the intermediate plastic film, the end wall of each cup-shaped element also being arc-shaped from one portion of the side wall to an opposite portion of the side wall so that the end wall deforms to produce a non-slip effect.

2. A non-slip fabric according to claim 1 wherein each of the end walls include at least one hole there through.

3. A non-slip fabric according to claim 1 wherein each of the end walls include two holes there through.

4. A non-slip fabric according to claim 1 wherein the sidewalls are straight.

5. A non-slip fabric according to claim 1 wherein the deformed plastic layer is made of EVA.

6. A non-slip fabric according to claim 1 including two holes through each end wall, the sidewalls being straight and the deformed plastic layer being EVA.

* * * * *